United States Patent
Kuo (10) Patent No.: US 7,450,769 B2
(45) Date of Patent: *Nov. 11, 2008

(54) IMAGE PROCESSING METHOD FOR FACILITATING DATA TRANSMISSION

(75) Inventor: Shih-Zheng Kuo, Taipei (TW)

(73) Assignee: Transpacific IP, Ltd., Taipei (TW)

(*) Notice: Subject to any disclaimer, the term of this patent is extended or adjusted under 35 U.S.C. 154(b) by 182 days.

This patent is subject to a terminal disclaimer.

(21) Appl. No.: 11/364,106

(22) Filed: Feb. 27, 2006

(65) Prior Publication Data

US 2006/0147120 A1 Jul. 6, 2006

Related U.S. Application Data

(63) Continuation of application No. 10/200,225, filed on Jul. 23, 2002, now Pat. No. 7,016,541.

(51) Int. Cl.
*G06K 9/36* (2006.01)
*G06K 9/46* (2006.01)

(52) U.S. Cl. ..................................... 382/232

(58) Field of Classification Search ......... 382/232–252, 382/166, 169; 358/426.01–426.16; 341/50–51, 341/67, 84, 97; 708/200, 277, 512, 517, 708/505, 204; 709/247
See application file for complete search history.

(56) References Cited

U.S. PATENT DOCUMENTS

| | | | |
|---|---|---|---|
| 5,365,465 A | 11/1994 | Larson | 708/204 |
| 5,708,729 A * | 1/1998 | Adams et al. | 382/169 |
| 5,933,360 A * | 8/1999 | Larson | 708/512 |
| 6,345,285 B1 | 2/2002 | Nagao et al. | 708/517 |
| 6,721,773 B2 | 4/2004 | Jennings | 708/505 |
| 6,788,224 B2 | 9/2004 | Leanza | 341/50 |

* cited by examiner

*Primary Examiner*—Sherali Ishrat
(74) *Attorney, Agent, or Firm*—Stolowitz Ford Cowger LLP (57) ABSTRACT

An image processing method for facilitating data transmission is provided. An image compression method is performed to convert X-bits binary digital signals to a binary compressed data in the form of $n*2^m$, in which n is represented by the former Y bits of the X-bits binary digital signals, m is set to the value of (X−Y), and represented by binary numbers with $[\log_2(X-Y+1)]$ bits. The binary compressed data is transmitted with a sequence of $[\log_2(X-Y+1)]+Y$ bits, representing (m, n), wherein m is the former $[\log_2(X-Y+1)]$ bits and n is the latter Y bits. Therefore, by the present image compression method, the transmission amount of image data is reduced. The transmission time of image data and the volume of a memory for storing the image data are also reduced.

65 Claims, 5 Drawing Sheets

Table 1

| Before compression | After compression | After recovery |
|---|---|---|
| 0000,0000 => | 00 00000 => | 0000,0000 |
| 0000,0001 => | 00 00001 => | 0000,0001 |
| 0000,0010 => | 00 00010 => | 0000,0010 |
| 0000,0011 => | 00 00011 => | 0000,0011 |
| 0000,0100 => | 00 00100 => | 0000,0100 |
| 0000,0101 => | 00 00101 => | 0000,0101 |
| 0000,0110 => | 00 00110 => | 0000,0110 |
| 0001,0000 => | 00 10000 => | 0001,0000 |
| 0010,0000 => | 01 10000 => | 0010,0000 |
| 0010,0001 => | 01 10000 => | 0010,0000 |
| 0010,0010 => | 01 10001 => | 0010,0010 |
| 0010,0011 => | 01 10001 => | 0010,0010 |
| 0010,0100 => | 01 10010 => | 0010,0100 |
| 0010,0101 => | 01 10010 => | 0010,0100 |
| 0100,0000 => | 10 10000 => | 0100,0000 |
| 0100,0001 => | 10 10000 => | 0100,0000 |
| 0100,0010 => | 10 10000 => | 0100,0000 |
| 0100,0011 => | 10 10000 => | 0100,0000 |
| 0100,0100 => | 10 10001 => | 0100,0100 |
| 0100,0101 => | 10 10001 => | 0100,0100 |
| 1111,0000 => | 11 11110 => | 1111,0000 |
| 1111,1000 => | 11 11111 => | 1111,1000 |
| 1111,1100 => | 11 11111 => | 1111,1100 |
| 1111,1101 => | 11 11111 => | 1111,1100 |
| 1111,1110 => | 11 11111 => | 1111,1100 |
| 1111,1111 => | 11 11111 => | 1111,1100 |

FIG.7

IMAGE PROCESSING METHOD FOR FACILITATING DATA TRANSMISSION

CROSS-REFERENCE TO RELATED APPLICATIONS

This application is a continuation of U.S. application Ser. No. 10/200,225, filed Jul. 23, 2002 now U.S. Pat. No. 7,016,541.

BACKGROUND OF THE INVENTION

1. Field of the Invention

The present invention relates to an image processing method, and more particularly, to an image compression method for binary digital signals.

2. Description of the Prior Art

Without image compression, the transmission of images requires an unacceptable bandwidth in many applications. As a result, methods of compressing images have been the subject of numerous research publications. Image compression schemes convert an image consisting of a two-dimensional array of pixels into a sequence of bits, which are to be transmitted over a communication link. Each pixel represents the intensity of the image at a particular location therein. The transmission link may be an ordinary telephone line.

Consider an image comprising a gray-scale representation of a photograph at a resolution of 1000×1000 lines. Each pixel typically consists of 8 bits, which are used to encode 256 possible intensity levels at the corresponding point on the photograph. Hence, without compression, transmission of the photograph requires that 8 million bits be sent over the communication link. A typical telephone line is capable of transmitting about 9600 bits per second; hence the picture transmission would require more than 10 minutes. Transmission times of this magnitude are unacceptable.

As a result, image compression systems are needed to reduce the transmission time. It will also be apparent to those skilled in the art that image compression systems may also be advantageously employed in image storage systems to reduce the amount of memory needed to store one or more images.

Image compression involves transforming the image to a form, which can be represented in fewer bits without losing the essential features of the original images. The transformed image is then transmitted over the communication link and the inverse transformation is applied at the receiver to recover the image. The compression of an image typically requires two steps. In the first step, the image is transformed to a new representation in which the correlation between adjacent pixels is reduced. This transformation is usually completely reversible, that is, no information is lost at this stage. The number of bits of data needed to represent the transformed image is at least as large as that needed to represent the original image. The purpose of this transformation is to provide an image representation, which is more ideally suited to known compression methods.

In the second step, referred to as quantization, each pixel in the transformed image is replaced by a value, which is represented in fewer bits, on average, than the original pixel value. In general, the original gray scale is replaced by a new scale, which has coarser steps and hence can be represented in fewer bits. The new gray scale is calculated from the statistical distribution of the pixel values in the transformed image.

The quantized image resulting from the above two steps is often further coded for transmission over the communication link. This coding is completely reversible. Its purpose is to provide a more compact representation of the quantized picture. At the other end of the communication link, the coded image is decoded, the quantization transformation is reversed and the inverse of the first transformation is performed on the resulting image to provide a reconstructed image.

However, the known image compression method usually utilizes a complicated encoding and decoding circuitry to attain the more compact image data for transmission. The coding/decoding process is also complicated. Moreover, the image transformation circuitry is a significant cost factor in image compression apparatuses. The required computational expense clearly depends on the image transformation selected. Hence, an image compression method, which requires less computation than the prior image compression method, would be advantageous.

SUMMARY OF THE INVENTION

It is one objective of the present invention to provide an image processing method for facilitating data transmission, which performs an image compression method for converting X-bits binary digital signals to a binary compressed data in the form of $n*2^m$, in which n is represented by the former Y bits of the X-bits binary digital signals, m is set to (X−Y), and represented with $[\log_2(X-Y+1)]$ bits, such that the binary compressed data can be transmitted with a sequence of $[\log_2(X-Y+1)]$ bits, representing (m, n), wherein m is the former $[\log_2(X-Y+1)]$ bits and n is the latter Y bits. Therefore, the transmission amount of image data is reduced, and the transmission rate of the image data is facilitated.

It is another objective of the present invention to provide an image processing method for facilitating data transmission, which implements a simple compression method to convert X-bits binary digital signals to a binary compressed data in the form of $n*2^m$. The complicated encoding and decoding processes for image compression and processing circuits therefore are omitted by the present compression method.

It is a further objective of the present invention to provide an image processing method, which performs a bit-enhanced technology to compensate decompressed image data to increase the accuracy of the recovery of the image data.

In order to achieve the above objectives of this invention, the present invention provides an image processing method for facilitating data transmission. The present method comprises capturing an image signal from an object with an image capture device, and providing the image signal to an analog-to-digital converter for converting the image signal to X-bits binary digital signals, wherein X is a natural number. Then, the X-bits binary digital signals is transmitted to image processing means for compressing the X-bits binary digital signals to a binary compressed data in the form of $n*2^m$, wherein X bits includes bit (X−1) to bit 0, m is a non-negative integer; when n is represented by the former Y bits of the X-bits binary digital signals, Y is a natural number, m is set to (X−Y), and then m is represented by binary numbers with $[\log_2(X-Y+1)]$ bits. Accordingly, the X-bits binary digital signals are converted to the binary compressed data represented by (m, n) with a sequence of $[\log_2(X-Y+1)]+Y$ bits, wherein m is the former $[\log_2(X-Y+1)]$ bits and n is the latter Y bits. The binary compressed data represented by (m, n) with the sequence of $[\log_2(X-Y+1)]+Y$ bits is then transmitted to memory means for storage. By the present image compression method, the transmission amount of image data is reduced. The transmission rate of image data is facilitated and the volume of a memory for storing the image data is also reduced.

BRIEF DESCRIPTION OF THE DRAWINGS

The objectives and features of the present invention as well as advantages thereof will become apparent from the following detailed description, considered in conjunction with the accompanying drawings.

DESCRIPTION OF THE PREFERRED EMBODIMENTS

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams and flowcharts.

Figure 1:
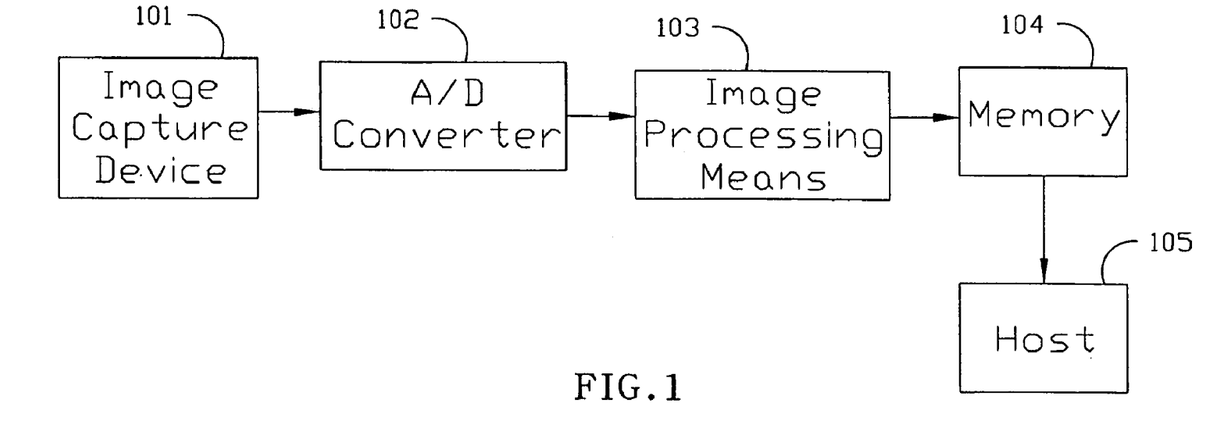
FIG. 1 is a block diagram of an image processing system implementing image compression methods of the present invention.
Figure 2:
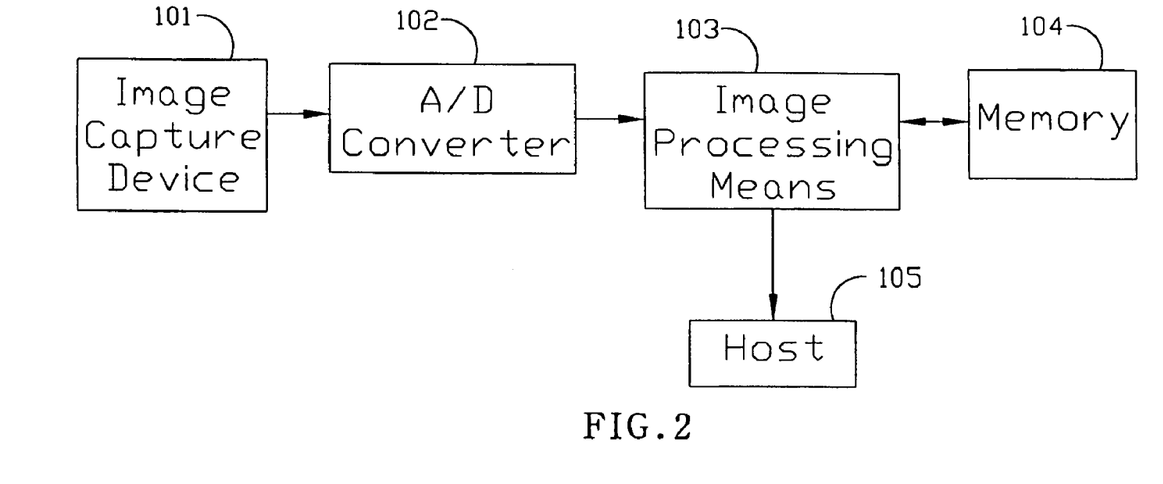
FIG. 2 is a block diagram of another image processing system implementing the image compression methods of the present invention.
Figure 3:
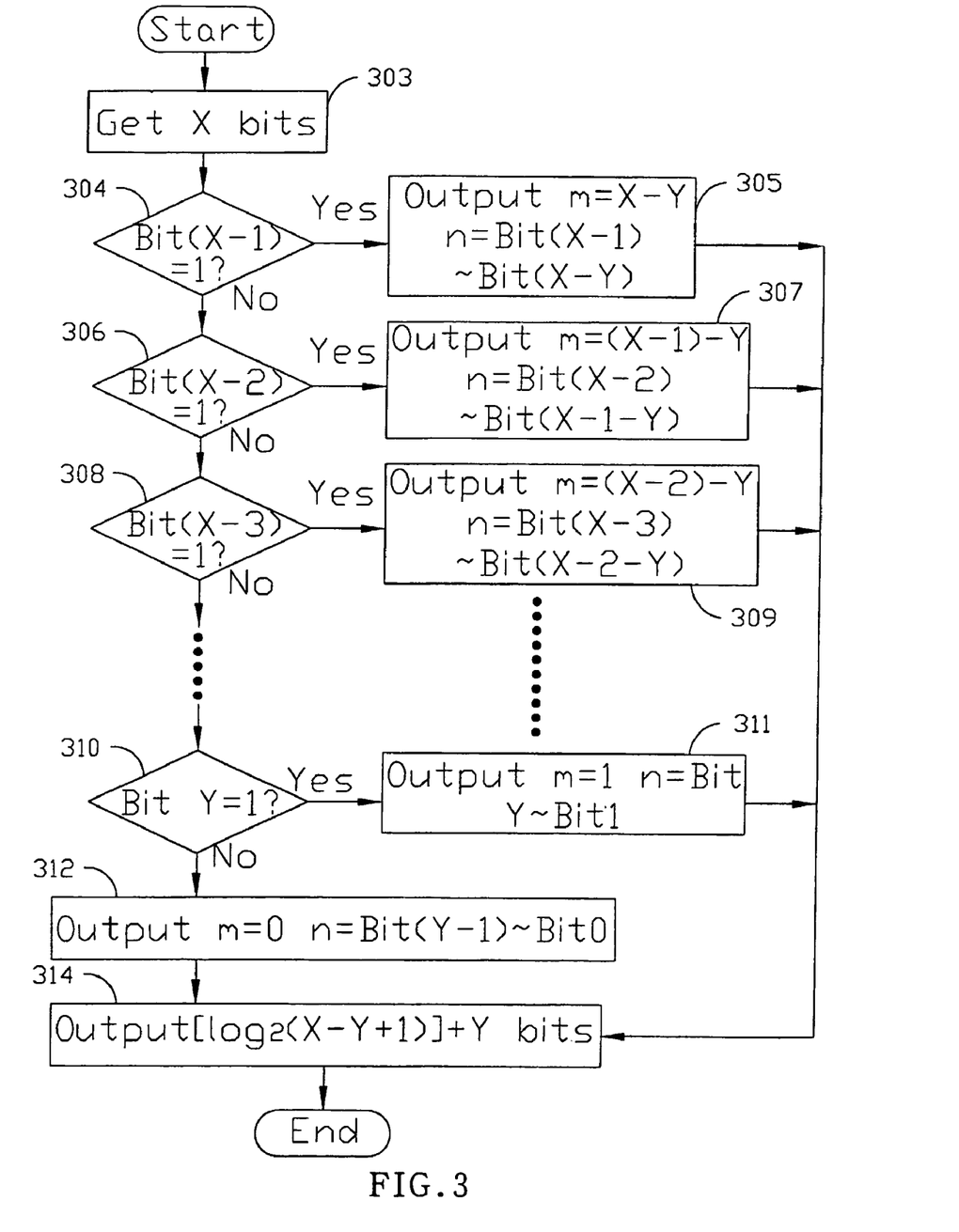
FIG. 3 is a flow chart of a first embodiment of the present invention illustrating the present image compression method.
Figure 4:
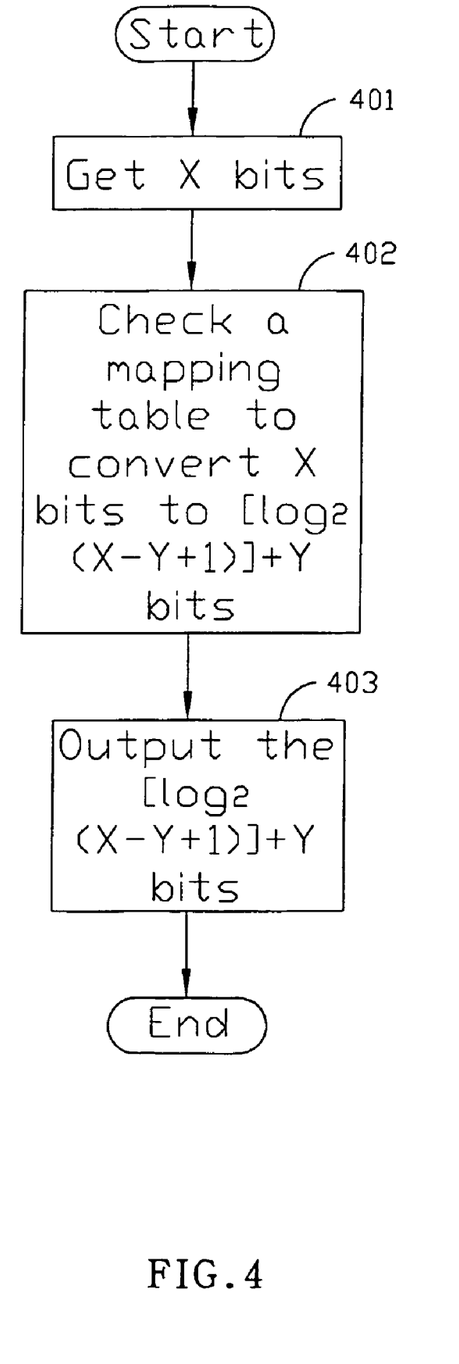
FIG. 4 is a flow chart of a second embodiment of the present invention illustrating the present image compression method.
Figure 5:
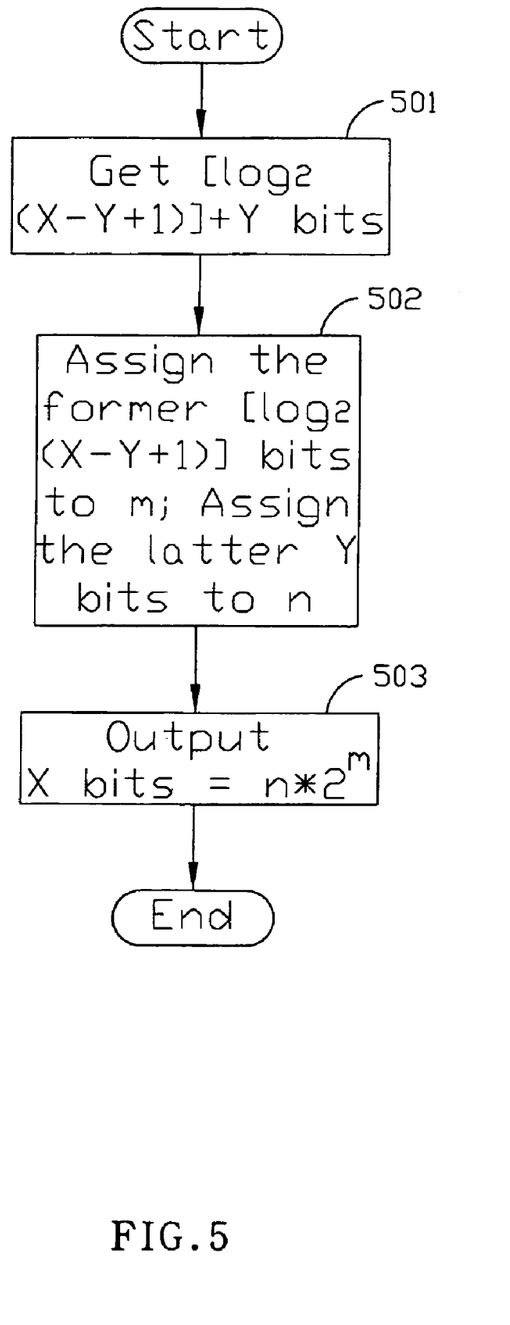
FIG. 5 is a flow chart for illustrating an image decompression process of the present invention.
Figure 6:
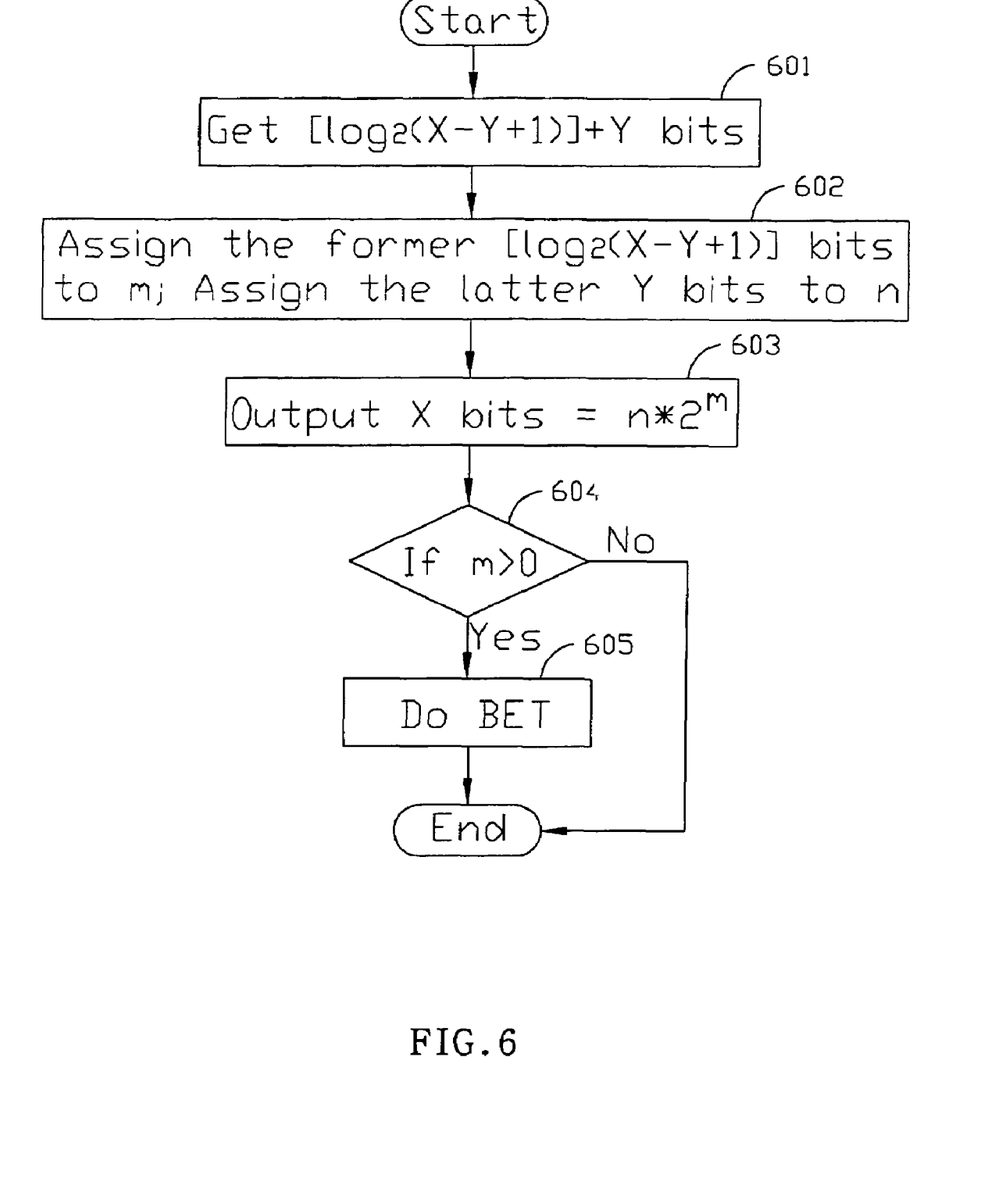
FIG. 6 is a flow chart for illustrating another image decompression process of the present invention.
Figure 7:
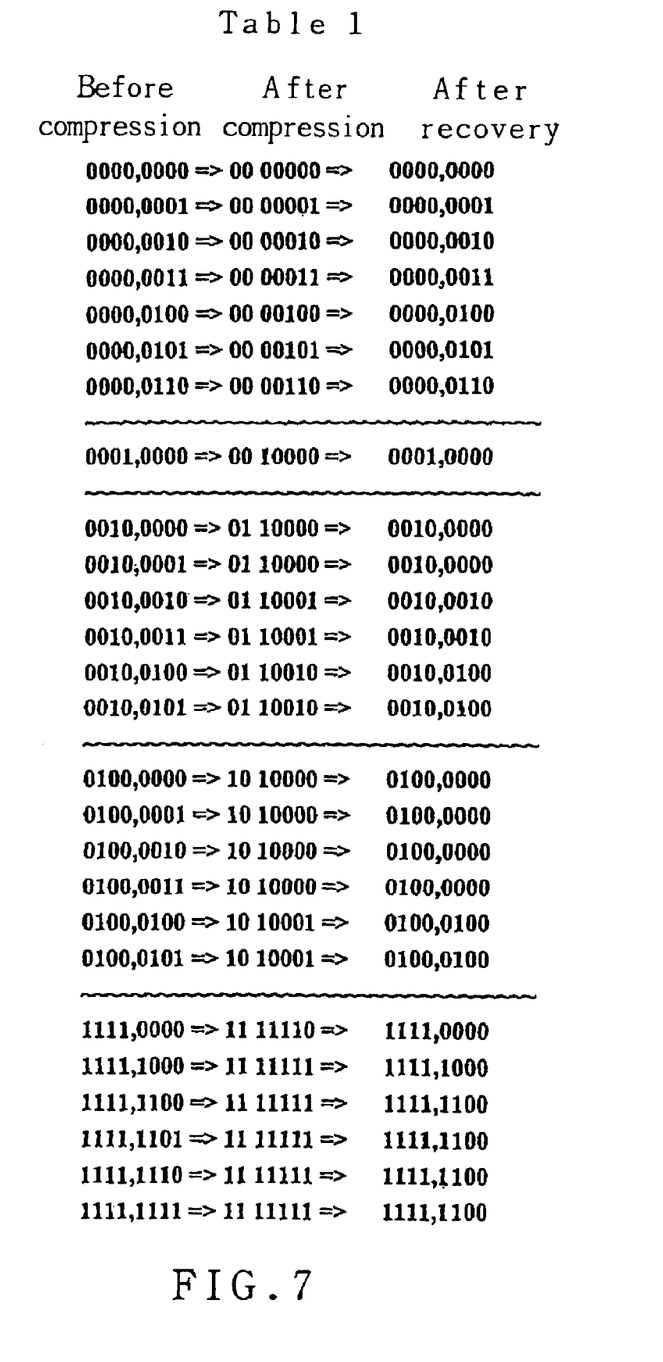
FIG. 7 is a table I listing 8-bits binary image data, and 7-bits binary compressed data and recovered image data thereof.

FIG. 1 is a block diagram of an image processing system implementing image compression methods of the present invention, and FIG. 2 is a block diagram of another image processing system implementing the image compression methods of the present invention. FIG. 3 is a flow chart of a first embodiment of the present invention illustrating the present image compression method. FIG. 4 is a flow chart of a second embodiment of the present invention illustrating the present image compression method. FIG. 5 is a flow chart for illustrating an image decompression process of the present invention, and FIG. 6 is a flow chart for illustrating another image decompression process of the present invention. FIG. 7 is a table I listing 8-bits binary image data, and 7-bits binary compressed data and recovered image data thereof.

Initially, referring to FIG. 1, an image is captured from an object by an image capture device 101, e.g. charge-coupled device (CCD), CMOS sensor and the like capable of converting an image signal to an electric signal. The image signal represents intensity of a pixel of the image captured by the image capture device 101. The electric signal is then provided to an A/D converter (analog-to-digital converter) 102 to convert to X-bits binary digital signals, which are consisted of binary values from bit (X−1) to bit 0. The X-bits binary digital signals are transmitted to image processing means 103, e.g. an image processing circuit, for being compressed to a binary compressed data in the form of $n*2^m$. N is represented by the former Y bits of the X-bits binary digital signals, Y is a natural number, and m is set to (X−Y) and represented by binary numbers with $[\log_2(X-Y+1)]$ bits. Hence, by image processing means 103, the X-bits binary digital signals are converted to the binary compressed data represented by (m, n) with a sequence of $[\log_2(X-Y+1)]+Y$ bits, wherein the former $[\log_2(X-Y+1)]$ bits and n is the latter Y bits. The binary compressed data is then transmitted with a set of binary values consisted of the sequence of $[\log_2(X-Y+1)]+Y$ bits, (x x ..., x), to a memory 104, e.g. a buffer memory, for storage.

FIG. 3 is a flow chart of a first embodiment of the present invention illustrating the image compression process implemented by image processing means 103. The image compression process of the first embodiment will be described in detail in the following. In step 303, the X-bits binary digital signals consisted of binary values from bit (X−1) to bit 0 is provided to image processing means 103. The X-bits binary digital signals are converted to the binary compressed data in the form of $n*2^m$, wherein n is represented by the former Y bits of the X-bits binary digital signals. Following, in step 304, when bit (X−1) is logic level "1", n is represented by the former bit (X−1) to bit (X−Y) of the X-bits binary digital signals, m is set to (X−Y) and represented by binary numbers with $[\log_2(X-Y+1)]$ bits, as step 305. The binary compressed data is then outputted by (m, n) with the sequence of $[\log_2(X-Y+1)]+Y$ bits, as step 314, wherein m is represented by the former $[\log_2(X-Y+1)]$ bits and n is the latter bits consisted of bit (X−1) to bit (X−Y). In step 306, when bit (X−1) is logic level "0" and bit (X−2) is logic level "1", n is represented by the former bit (X−2) to bit (X−1−Y) of the X-bits binary digital signals, m is set to (X−1−Y) and is represented by binary numbers with $[\log_2(X-Y+1)]$ bits, as step 307. The binary compressed data is then outputted by (m, n) with $[\log_2(X-Y+1)]+Y$ bits, as step 314, wherein m is represented by the former $[\log_2(X-Y+1)]$ bits and n is the latter bits consisted of bit (X−2) to bit (X−1−Y). In step 308, when bit (X−1) and bit (X−2) are logic level "0", and bit (X−3) is logic level "1", n is represented by the former bit (X−3) to bit (X−2−Y) of the X-bits binary digital signals, m is set to (X−2−Y) and is represented by binary numbers with $[\log_2(X-Y+1)]$ bits, as step 309. The binary compressed data is then outputted by (m, n) with $[\log_2(X-Y+1)]+Y$ bits, wherein m is represented by the former $[\log_2(X-Y+1)]$ bits and n is the latter bits consisted of bit (X−3) to bit (X−2−Y), as step 314.

Several similar data processing steps are performed until step 310, when each of bit (X−1) to bit (Y+1) is logic level "0" and bit Y is logic level "1", n is represented by bit Y to bit 1, m is set to 1 and is represented by binary digital numbers with $[\log_2(X-Y+1)]$ bits, as step 311. The binary compressed data is then outputted by (m, n) with $[\log_2(X-Y+1)]+Y$ bits, wherein m is represented by the former $[\log_2(X-Y+1)]$ bits and n is the latter bits consisted of bit Y to bit 1, as step 314. In step 312, when each of bit (X−1) to bit Y is logic level "0" and bit (Y−1) is logic level "1", n is represented by bit (Y−1) to bit 0, m is set to 0 and is represented by binary numbers with $[\log_2(X-Y+1)]$ bits, (00). The binary compressed data is then outputted by (m, n) with $[\log_2(X-Y+1)]+Y$ bits, wherein m is represented by the former $[\log_2(X-Y+1)]$ bits and n is the latter bits consisted of bit Y−1 to bit 0, as step 314.

FIG. 7 is a table I, listing 8-bits binary digital signals consisted of bit 7 to bit 0, and 7-bits binary compressed data and the recovered image data thereof. The 7-bits binary compressed data in table I are generated from the compression method according to the first embodiment, illustrated in FIG. 3, in which n is represented by the former 5 bits of the 8-bits binary digital signals, i.e. bit 7 to bit 3, and m is set to a value of 8−5=3, represented by $[\log_2(8-5+1)]$ bits, i.e. two bits. The 7-bits binary compressed data is represented by seven binary values "x x x x x x x". The former two binary values "x x" represent the value of m, and the latter five binary values "x x x x x" represent n. However, the present compression method is also suited to compress binary digital signals consisted of 10-bits, 12-bits and 16-bits, etc. And, n is determined according to quality of the image desired.

Referring to FIG. 1 again, the binary compressed data stored in the memory 104 is then outputted to a host 105 for further processing, such as decompressing to recover the original image data and print out. One decompression method of the present invention implemented in the host 105 is illustrated in FIG. 5. In step 501, the binary compressed data in the form of $n*2^m$ represented by (m, n) with $[\log_2(X-Y+1)]+Y$ bits are outputted to the host 105 from the memory 104. In step 502, the former $[\log_2(X-Y+1)]$ bits of the binary compressed data are assigned to m, thereby obtaining the value of m, and the latter Y bits of the binary compressed data are assigned to n. In step 503, based on the compression algorithm $n*2^m$, binary values of n and the value of m, the binary compressed data is decompressed to recover to the X-bits binary digital signals.

As shown in table I of FIG. 7, the higher the grayscale level of the pixel is, the higher the distortion of the recovered image data is. Thus, another decompression method of the present invention utilizing a bit-enhanced technology (BET) is provided to compensate loss of the recovered image data, which is illustrated in FIG. 6, in which, step 601 to step 603 are the same with step 501 to step 503 of FIG. 5. When m is a positive integer, as step 604, a bit-enhanced method is applied to the recovered image data. In step 605, the bit-enhanced method comprises steps of (a) calculating a first average of a plurality of neighboring pixels around the pixel to be compensated; and (b) calculating a second average of the first average and the pixel. As a result, the compensated data of the pixel is obtained.

In accordance with the compressed method of FIG. 3, 8-bits binary digital signals are compressed to 7-bits binary compressed data, 10-bits binary digital signals are compressed to 9-bits binary compressed data, 12-bits binary digital signals are compressed to 11-bits binary compressed data, and 16-bits binary digital signals are compressed to 15-bits binary compressed data. Hence, transmission amount of the image data transmitted to the memory 104 and the host 105 is reduced. The transmission time of the image data is thus decreased, and the volume of the memory 104 for storing the image data is also reduced.

FIG. 4 is a flow chart of another image compression method according to a second embodiment of the present invention. In step 401, the X-bits binary digital signals consisted of binary values from bit (X−1) to bit 0 is provided to image processing means 103. In step 402, based on a mapping table, the X-bits binary digital signals are mapped to a binary compressed data represented by (m, n) with $[[\log_2(X-Y+1)]+Y]$-bits binary numbers, in which m is represented by the former $[\log_2(X-Y+1)$ bits and n is represented by the latter Y bits. The mapping table is generated according to the compression algorithm $n*2^m$, wherein n is represented by the former Y bits of the X-bits binary digital signals, m is set to (X−Y) and represented by binary numbers with $[\log_2(X-Y+1)]$ bits. In step 403, the binary compressed data is then transmitted to the memory 104 for storage.

FIG. 2 is a block diagram of another image processing system implementing the present image compression method, in which the binary compressed data stored in the memory 104 is accessed by image processing means 103, and then outputted to the host 105 for further processing, such as decompressing to recover the original image data. Since the data communication between image processing means 103, the memory 104 and the host 105 is in the form of the binary compressed data, the transmission amount of the image data between them is reduced, and the transmission time of the image data is therefore reduced.

With reference to the list of table I of FIG. 7 again, the recovered image data of a pixel with a low grayscale level is less distorted, and the recovered image data of a pixel with a higher grayscale level is more distorted. Therefore, a purpose for making the recovered image of a black-area image, i.e. image with low grayscale levels, non-distorted, and the recovered image of a white-area image, i.e. image with high grayscale levels, noise-eliminated, is obtained in accordance with the present image compression method of FIG. 3.

The embodiments are only used to illustrate the present invention, not intended to limit the scope thereof. Many modifications of the embodiments can be made without departing from the spirit of the present invention.

What is claimed is:

1. An apparatus, comprising:
    means for capturing an image signal of an object;
    means for converting said image signal to X-bits binary digital signals; and
    means for compressing said X-bits binary digital signals to a binary compressed data, wherein said binary compressed data is capable of being represented by (m, n) with the sequence of $[\log_2(X-Y+1)]+Y$ bits,
    wherein n comprises a former Y bits of said X-bits binary digital signals, and
    wherein m comprises (X−Y), and in is represented at least in part by binary numbers with $[\log_2(X-Y+1)]$ bits.

2. The apparatus according to claim 1, further comprising means for storing said binary compressed data.

3. The apparatus according to claim 1, further comprising a means for decompressing said binary compressed data.

4. The apparatus according to claim 3, further comprising means for displaying an image based at least in part upon said binary decompressed data.

5. A system, comprising:
    an image capture device capable of capturing an image signal of an object;
    a converter capable of converting said image signal to a binary digital signal, the binary digital signal comprising X-bits; and
    an image processor capable of compressing said binary digital signal represented at least in part by (m, n) with the sequence of $[\log_2(X-Y+1)]+Y$ bits,
    wherein n comprises a former Y bits of said X-bits binary digital signals,
    wherein m comprises (X−Y), and m is represented at least in part by binary numbers with $[\log_2(X-Y+1)]$ bits.

6. The system according to claim 5, wherein said image processor is capable of storing said binary compressed data.

7. The system according to claim 5, further comprising a host capable of decompressing said binary compressed data to obtain decompressed binary data.

8. The system according to claim 7, further comprising a display device capable of displaying an image based at least in part upon said decompressed binary data.

9. The system according to claim 5, wherein X comprises a natural number.

10. The system according to claim 5, wherein said compressing by said image processor comprises compressing said X-bits binary digital signals to a binary compressed data in the form of $n*2^m$.

11. The system according to claim 10, wherein X bits comprises bit (X−1) to bit 0.

12. The system according to claim 5, wherein m comprises a non-negative integer.

13. The system according to claim 5, wherein n is represented by the former Y bits of said X-bits binary digital signals.

14. The system according to claim 13, wherein Y comprises a natural number.

15. The system according to claim 14, wherein m is represented by binary numbers with $[\log_2(X-Y+1)]$ bits, such that said X-bits binary digital signals are capable of being converted to said binary compressed data represented at least in part by (m, n) with a sequence of $[\log_2(X-Y+1)]+Y$ bits.

16. The system according to claim 5, wherein m comprises a former $[\log_2(X-Y+1)]$ bits, and n comprises a latter Y bits.

17. A method, comprising:
   obtaining an image signal from an object utilizing an image capture device;
   converting said image signal to X-bits binary digital signals; and
   compressing said X-bits binary digital signals to a binary compressed data,
   wherein said binary compressed data is represented at least in part by (m, n) with the sequence of $[\log_2(X-Y+1)]+Y$ bits,
   wherein n comprises a former Y bits of said X-bits binary digital signals, and
   wherein m is (X–Y), and m is represented at least in part by binary numbers with $[\log_2(X-Y+1)]$ bits.

18. The method according to claim 17, further comprising storing said binary compressed data.

19. The method according to claim 17, further comprising decompressing said binary compressed data.

20. The method according to claim 19, further comprising displaying an image based at least in part upon said binary decompressed data.

21. The method according to claim 17, wherein X comprises a natural number.

22. The method according to claim 17, wherein said compressing comprises compressing said X-bits binary digital signals to a binary compressed data in the form of $n*2^m$.

23. The method according to claim 22, wherein X bits comprises bit (X–1) to bit 0.

24. The method according to claim 17, wherein m comprises a non-negative integer.

25. The method according to claim 17, wherein n is represented by the former Y bits of said X-bits binary digital signals.

26. The method according to claim 25, wherein Y comprises a natural number.

27. The method according to claim 26, wherein m is represented by binary numbers with $[\log_2(X-Y+1)]$ bits, such that said X-bits binary digital signals are capable of being converted to said binary compressed data represented at least in part by (m, n) with a sequence of $[\log_2(X-Y+1)]+Y$ bits.

28. The method according to claim 17, wherein m comprises a former $[\log_2(X-Y+1)]$ bits, and n comprises a latter Y bits.

29. The method according to claim 17, wherein compressing further comprises:
   if bit (X–1) is logic level "1", n is represented at least in part by a former bit (X–1) to bit (X–Y) of said X-bits binary digital signals, and in is set to (X–Y), and is represented at least in part by binary numbers with $[\log_2(X-Y+1)]$ bits, said binary compressed data is outputted by (m, n) with the sequence of $[\log_2(X-Y+1)]+Y$ bits, wherein m is represented at least in part by the former $[\log_2(X-Y+1)]$ bits and n is a latter bits comprising said bit (X–1) to said bit (X–Y).

30. The method according to claim 17, wherein compressing further comprises:
   if bit (X–1) is logic level "0" and bit (X–2) is logic level "1", n is represented at least in part by a former bit (X–2) to bit (X–1–Y) of said X-bits binary digital signals, m is set to (X–1–Y) and is represented at least in part by binary numbers with $[\log_2(X-Y+1)]$ bits, said binary compressed data is outputted by (m, n) with $[\log_2(X-Y+1)]+Y$ bits, wherein m is represented at least in part by a former $[\log_2(X-Y+1)]$ bits and n is a latter bits consisted of said bit (X–2) to said bit (X–1–Y).

31. The method according to claim 17, wherein compressing further comprises:
   if bit (X–1) and bit (X–2) are logic level "0", and bit (X–3) is logic level "1", n is represented at least in part by a former bit (X–3) to bit (X–2–Y) of said X-bits binary digital signals, in is set to (X–2–Y) and is represented at least in part by binary numbers with $[\log_2(X-Y+1)]$ bits, said binary compressed data is outputted by (m, n) with $[\log_2(X-Y+1)]+Y$ bits, wherein m is represented at least in part by a former $[\log_2(X-Y+1)]$ bits and n is the latter bits comprising said bit (X–3) to said bit (X–2–Y).

32. The method according to claim 17, wherein compressing further comprises:
   if each of bit (X–1) to bit (Y+1) is logic level "0" and bit Y is logic level "1", n is represented at least in part by bit Y to bit 1, in is set to 1 and is represented at least in part by binary numbers with $[\log_2(X-Y+1)]$ bits, said binary compressed data is outputted by (m, n) with $[\log_2(X-Y+1)]+Y$ bits, wherein m is represented at least in part by a former $[\log_2(X-Y+1)]$ bits and n is a latter bits comprising said bit Y to said bit 1.

33. The method according to claim 17, wherein compressing further comprises:
   if each of bit (X–1) to bit Y is logic level "0" and bit (Y-1) is logic level "1", n is represented at least in part by bit (Y–1) to bit 0, m is set to 0 and is represented at least in part by binary numbers with $[\log_2(X-Y+1)]$ bits, said binary compressed data is outputted by (m, n) with $[\log_2(X-Y+1)]+Y$ bits, wherein m is represented at least in part by a former $[\log_2(X-Y+1)]$ bits and n is a latter bits consisted of said bit Y–1 to said bit 0.

34. An apparatus, comprising:
   means for capturing an image signal of an object;
   means for converting said image signal to X-bits of binary digital signals;
   means for compressing said X-bits of binary digital signals into a binary compressed logarithmic data and representing said binary compressed logarithmic data as m; and
   means for representing a former Y bits of the X-bits of binary data as n and outputting a sequence of the binary compressed data as (m,n).

35. The apparatus according to claim 34, further comprising means for compressing the binary data as $n*2^m$, where m is set to (X–Y).

36. The apparatus according to claim 34, further comprising a means for transmitting the binary compressed data with a sequence of $[\log_2(X-Y+1]+Y$ bits representing (m,n) wherein m is a former $[\log_2(X-Y+1)]$ bits and n is a latter Y bits.

37. The apparatus according to claim 36, further comprising means for displaying an image based at least in part upon said binary decompressed data.

38. A method, comprising:
   obtaining an image signal from an object utilizing an image capture device;
   converting said image signal to X-bits of binary digital signals; and compressing said binary digital signals to a binary compressed data as $n*2^m$, where n comprises a former Y bits of said X-bits of binary digital signals and m is set to (X−Y).

39. The method according to claim 38, further comprising transmitting the binary compressed data with a sequence of $[\log_2(X-Y+1)]+Y$ bits representing (m,n), wherein m is a former $[\log_2(X-Y+1)]$ bits and n is a latter Y bits.

40. The method according to claim 38, further comprising decompressing said binary compressed data.

41. The method according to claim 40, further comprising displaying an image based at least in part upon said binary decompressed data.

42. The method according to claim 38, wherein said binary compressed data is represented at least in part by (m, n) with the sequence of $[\log_2(X-Y+1)]+Y$ bits.

43. The method according to claim 42, wherein n comprises a former Y bits of said X-bits binary digital signals.

44. The method according to claim 42, wherein m is (X−Y), and m is represented at least in part by binary numbers with $[\log_2(X-Y+1)]$ bits.

45. The method according to claim 42, wherein n is represented by the former Y bits of said X-bits binary digital signals.

46. The method according to claim 42, wherein Y comprises a natural number.

47. The method according to claim 46, wherein m is represented by binary numbers with $[\log_2(X-Y+1)]$ bits, such that said X-bits binary digital signals are capable of being converted to said binary compressed data represented at least in part by (m, n) with a sequence of $[\log_2(X-Y+1)]+Y$ bits.

48. The method according to claim 42, wherein m comprises a former $[\log_2(X-Y+1)]$ bits, and n comprises a latter Y bits.

49. A system, comprising:
an image capture device capable of capturing an image signal of an object;
a converter capable of converting said image signal to X-bits of a binary digital signal;
an image processor capable of compressing said binary digital signal to create binary compressed data, wherein said binary compressed data comprises a sequence of logarithmic data represented by m applied to a former Y bits of the X-bits of binary data represented as n and outputting a sequence of the binary compressed data as (m, n).

50. The system according to claim 49, wherein said binary compressed data is represented at least in part by (m, n) with the sequence of $[\log_2(X-Y+1)]+Y$ bits.

51. The system according to claim 49, wherein the compressed binary data is represented as $n*2^m$, where n comprises Y bits of said X-bits of binary digital signals and m is set to (X−Y).

52. The system according to claim 50, wherein m is represented at least in part by binary numbers with $[\log_2(X-Y+1)]$ bits.

53. The system according to claim 49, wherein said image processor is capable of storing said binary compressed data.

54. The system according to claim 49, further comprising a host capable of decompressing said binary compressed data to obtain decompressed binary data.

55. The system according to claim 54, further comprising a display device capable of displaying an image based at least in part upon said decompressed binary data.

56. A system, comprising:
an image capture device capable of capturing an image signal;

a converter capable of converting said image signal to a binary digital signal, the binary digital signal comprising a number of bits; and
an image processor capable of compressing said binary digital signal to create binary compressed data, wherein said binary compressed data comprises two logarithmic data bits,
wherein the second bit of said two logarithmic data bits is capable of being defined at least in part by former bits of said number of bits of the binary digital signal,
wherein the first bit of said two logarithmic data bits comprises said number of bits of the binary digital signal minus said former bits, and said first bit is capable of being defined at least in part by, a log base 2 of said number of bits of the binary digital signal minus said former bits plus 1, bits.

57. The system according to claim 56, wherein said image processor is capable of storing said binary compressed data.

58. The system according to claim 56, further comprising a host capable of decompressing said binary compressed data to obtain decompressed binary data.

59. The system according to claim 58, further comprising a display device capable of displaying an image based at least in part upon said decompressed binary data.

60. A method for recovering a data signal from a compressed data signal, said data signal including X data bits, said compressed data signal including $[\log_2(X-Y+1)]+Y$ data bits, wherein X and Y are positive integers and X is greater than Y, the method comprising:
assigning a former $[\log_2(X-Y+1)]$ bits of the compressed data signal to a value m;
assigning a latter Y bits of said compressed data signal to a value n; and
generating said X data bits of said data signal as $n*2^m$.

61. The method of claim 60, the method further comprising:
in response to m being a positive integer, compensating a pixel associated with said data signal.

62. The method of claim 61, wherein compensating the pixel comprises:
calculating a first average for a plurality of pixels neighboring said pixel;
calculating a second average for the first average and said pixel; and
compensating the data signal associated with said pixel with said second average.

63. A computer readable medium having instructions stored thereon that, if executed by a computing platform, are adapted to cause said computing platform to recover a data signal from a compressed data signal, wherein said data signal including X data bits, wherein said compressed data signal including $[\log_2(X-Y+1)]+Y$ data bits, and wherein X and Y are positive integers and X is greater than Y, the recovery of the data signal performed by:
assigning a former $[\log_2(X-Y+1)]$ bits of the compressed data signal to a value m;
assigning a latter Y bits of said compressed data signal to a value n; and
generating said X data bits of said data signal as $n*2^m$.

64. The computer readable medium of claim 63, wherein instructions stored thereon, if executed by a computing platform, are adapted to cause said computing platform to recover the data signal by:
compensating a pixel associated with said data signal in response to m being a positive integer.

65. The computer readable medium of claim 64, wherein instructions stored thereon, if executed by a computing platform, are adapted to cause said computing platform to compensate the pixel by:

calculating a first average for a plurality of pixels neighboring said pixel;

calculating a second average for the first average and said pixel; and     compensating the data signal associated with said pixel with said second average.

* * * * *

UNITED STATES PATENT AND TRADEMARK OFFICE
CERTIFICATE OF CORRECTION

PATENT NO. : 7,450,769 B2  
APPLICATION NO. : 11/364106  
DATED : November 11, 2008  
INVENTOR(S) : Kuo

Page 1 of 1

It is certified that error appears in the above-identified patent and that said Letters Patent is hereby corrected as shown below:

At column 6, line 25, please replace "and in is represented" with --and m is represented--.
At column 7, line 57, please replace "and in is set" with --and m is set--.
At column 8, line 13, please replace "in is set to" with --m is set to--.
At column 8, line 23, please replace "in is set to" with --m is set to--.
At column 8, line 45, please replace "into a binary" with --into binary--.
At column 8, line 56, please replace "(X-Y+1]+Y" with --(X-Y+1)]+Y--.
At column 8, line 56, please replace "representing (m,n)" with --representing (m,n),--.

Signed and Sealed this

Sixth Day of July, 2010

David J. Kappos
*Director of the United States Patent and Trademark Office*